9847X
R. S. THOMAS.
Rotary Saw.
Patented July 1, 1836.
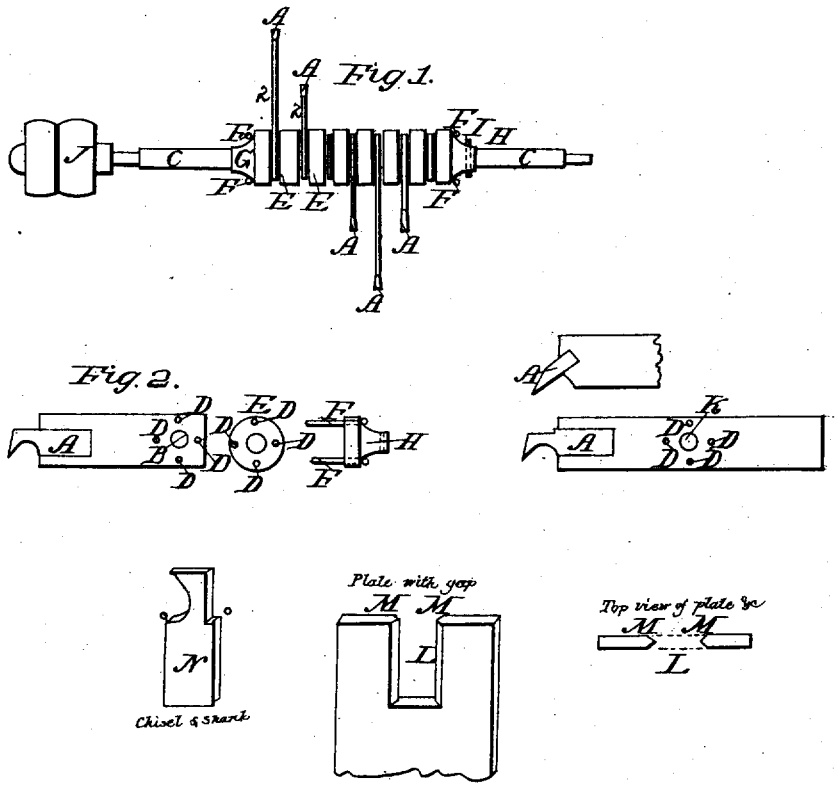
N. PETERS, Photo-Lithographer, Washington, D. C.

July 1. 1836

Robert Sands Thomas of Rockingham North Carolina
Letters Patent

The schedule referred to in these Letters Patent and making part of the same containing a description in the words of the said Robert Sands Thomas himself of his "Improvement in the manner of constructing the Rotary saw"

To all to whom these presents shall come Be it known that I Robert Sands Thomas of Rockingham in the County of Richmond and State of North Carolina have invented a new and useful improvement in the manner of constructing a rotary saw, and I do hereby declare, the nature of my said invention and the manner in which the same is to be performed, as being fully described and ascertained, in and by the drawing hereunto annexed, and the following description thereof, that is to say. The invention consists in attaching to a revolving shaft several plates of metal by an opening in one end there of fitting them to said shaft, while at the other end will be secured in a manner to be described hereafter a chisel shaped tooth which will be made movable for the purpose of repair &c, they will be placed at required distances asunder, and so arranged around the shaft as to form a continuation of plates and teeth in a spiral direction, thereby forming as many different saws revolving in a circle the radius of which will be the distance between the centre of the shaft and the point of the tooth formed by the length of the plates. That my invention may be better understood I will now describe the drawing hereunto annexed and the figures and letters marked thereon, that is to say Description of the drawing.

Fig 1. is an elevation or side view of a shaft, and its several plates constituting a gang of toothed saws, placed at propeintervals in a spiral form around said shaft so as to cut several boards at once.

Fig 2. represents a plate of steel about the thickness of a common saw plate - with a chisel A fastened in the end, and the round hole B at the other end is intended for the reception of the iron axle. C to which it is to be fastened by bolts and screws through D. when one plate has been thus placed, a circular block E is passed on the shaft a round hole being made in the block for that purpose. and is intended to regulate the distance between the saw-plates for cutting the proper width of stuff.

Another toothed plate is now placed as the first was. but a little advanced or standing at a different angle with reference to that which the first made with the horizontal plane of the shaft, to this a block is again added, and then a plate and so on in a continued spiral form around the shaft as shewn in Fig X. This manner of placing them being effected (and in which they stand from opposite sides of the shaft in order to prevent them from the injurious effects of want of equilibrium) they are to be made fast in their positions by passing the bolts F through the fast flange G and the saw plate next to it, then through the block E and its plate, and so on through all until the last plate is secured by the outside loose flange H which is passed up to it, through which the bolts pass and are finally secured by screw nuts. when it is only left to pass a bolt I. through the loose flange and shaft to make all secure. The shaft is driven by the pulley J. from any given power.

Should it be desired to work only one saw plate, then the axis must pass through the centre of it, as at K in order to preserve the proper counterpoise. The gap or notch L is made in the plate for the reception of each tooth or chis cl. about one inch and a half deep, and about one inch wide. they are to be bevelled on each side as at M so as to have two parallel angular shaped edges running down to their base — N is the shank of the chisel having corre-sponding grooves in the lateral edges O so as to fit with accuracy the gaps L above described.

It will be obvious that the points of the chisels should be somewhat under than their shanks in order to allow the plate free passage as it follows the saw tooth or chisel. And when a single chisel is used it will be necessary to feed up the log to it, by means of the ratchet wheel & hand commonly used for that purpose

What I claim as my invention is the manner of combining and arranging the toothed plates above described so as to form a succession of saws in a spiral direction or line around the shaft for each plate to effect its cut as a sep-arate saw. In testimony that the above is a full description of my improvement as invented by me, I have hereunto set my hand.

R. S. Thomas.

Witnesses
Henry Stone
B. K. Morsell (Patented 1st July 1836)

943 words